Dec. 31, 1963  W. M. TYRRELL ET AL  3,115,767
APPARATUS FOR TESTING THE FLUID FLOW
CHARACTERISTICS OF PERVIOUS OBJECTS
Filed May 20, 1960  2 Sheets-Sheet 1
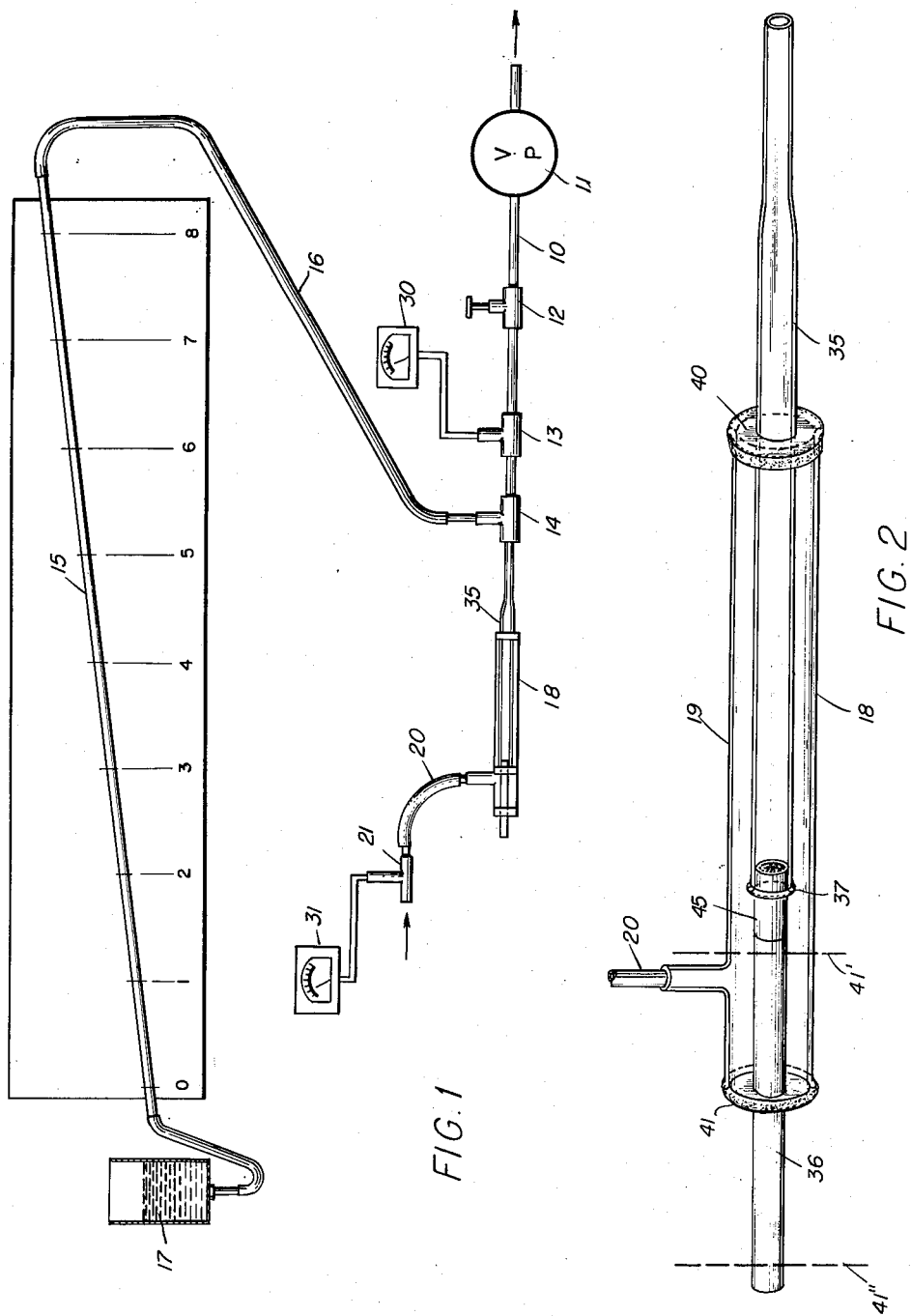

Dec. 31, 1963  W. M. TYRRELL ET AL  3,115,767
APPARATUS FOR TESTING THE FLUID FLOW
CHARACTERISTICS OF PERVIOUS OBJECTS
Filed May 20, 1960  2 Sheets-Sheet 2

United States Patent Office 3,115,767
Patented Dec. 31, 1963

3,115,767
APPARATUS FOR TESTING THE FLUID FLOW CHARACTERISTICS OF PERVIOUS OBJECTS
William M. Tyrrell and Joseph C. Holmes, Richmond, Va., assignors to Philip Morris Incorporated, New York, N.Y., a corporation of Virginia
Filed May 20, 1960, Ser. No. 30,654
6 Claims. (Cl. 73—38)

The invention is concerned with an apparatus for testing a pervious or porous object to determine its fluid flow characteristics, that is the resistance offered to the flow of fluid therethrough and the amount of fluid which will pass therethrough under various selected pressure differentials. The apparatus is readily adapted to the testing of various objects or kinds of material and has the particular advantage of being capable of adaptation and adjustment to the testing of selected areas or portions of an object.

As a specific and important application the apparatus is employed in the testing of elongated objects of which a cigarette is the most common form. In the manufacture of cigarettes it is important to determine the resistance to draw under varying conditions of different kinds of tobacco filler and different degrees of density or compacting of the filler. Also it is important to determine the resistance to draw of a filter for the cigarette where that is employed or proposed and, as in the case of the tobacco filler. The filter may vary as to density, length and other characteristics which are inherent or produced, dependent upon the materials employed and the character of the packaging thereof.

A related important factor which it is commonly desired to test and determine is the amount of air flow through different parts of the cigarette under various conditions. In the manufacture of different types of cigarettes and particularly in experimenting therewith the physical construction and relations may vary considerably. For example a filter cigarette may have air leakage around the joint including the seam of the tipping paper employed to secure the filter to the end of the tobacco rod part. This may be a desired condition and in fact vent holes in some cigarettes are expressly provided at that region or at different points along the length of the cigarette. In addition it is common to employ in some types of cigarettes paper having substantial porosity and corresponding air leakage through the wall of the cigarette.

The present apparatus is capable of readily determining the air leakage at selected regions of a cigarette and under different selected conditions including the pressure differential and resistance to draw. Particularly the dilution of the air or gas stream through the cigarette can be determined, that is, of the total gas delivered at the mouth end, the amounts which enter along the length through the wall of the cigarette relative to the amount which enters at the outer end. These amounts can be measured in absolute values and the proportions thereby determined and the leakage or dilution determined independently for different regions along the cigarette. The values thus obtained can be correlated with other factors such as the amount of solids or gases in the gas mixture delivered at the mouth end derived from the combustion under different conditions.

Other uses and advantages of the apparatus and principles embodied therein will be apparent from a consideration of the specific examples and apparatus to be described hereinafter. The invention accordingly comprises the features of construction, combination of elements and principles of operation which will be exemplified in the constructions hereinafter set forth and the scope of the invention will be indicated in the claims.

Reference should be had in connection with the following detailed description to the accompanying drawings in which:

FIG. 1 is a diagrammatic assembly figure of the system especially adapted for testing the flow characteristics of a cigarette or similar article;

FIG. 2 is a view on an enlarged scale of the cigarette holder with the means for adjusting the air by-pass means along the length of the cigarette.

Figure 3:
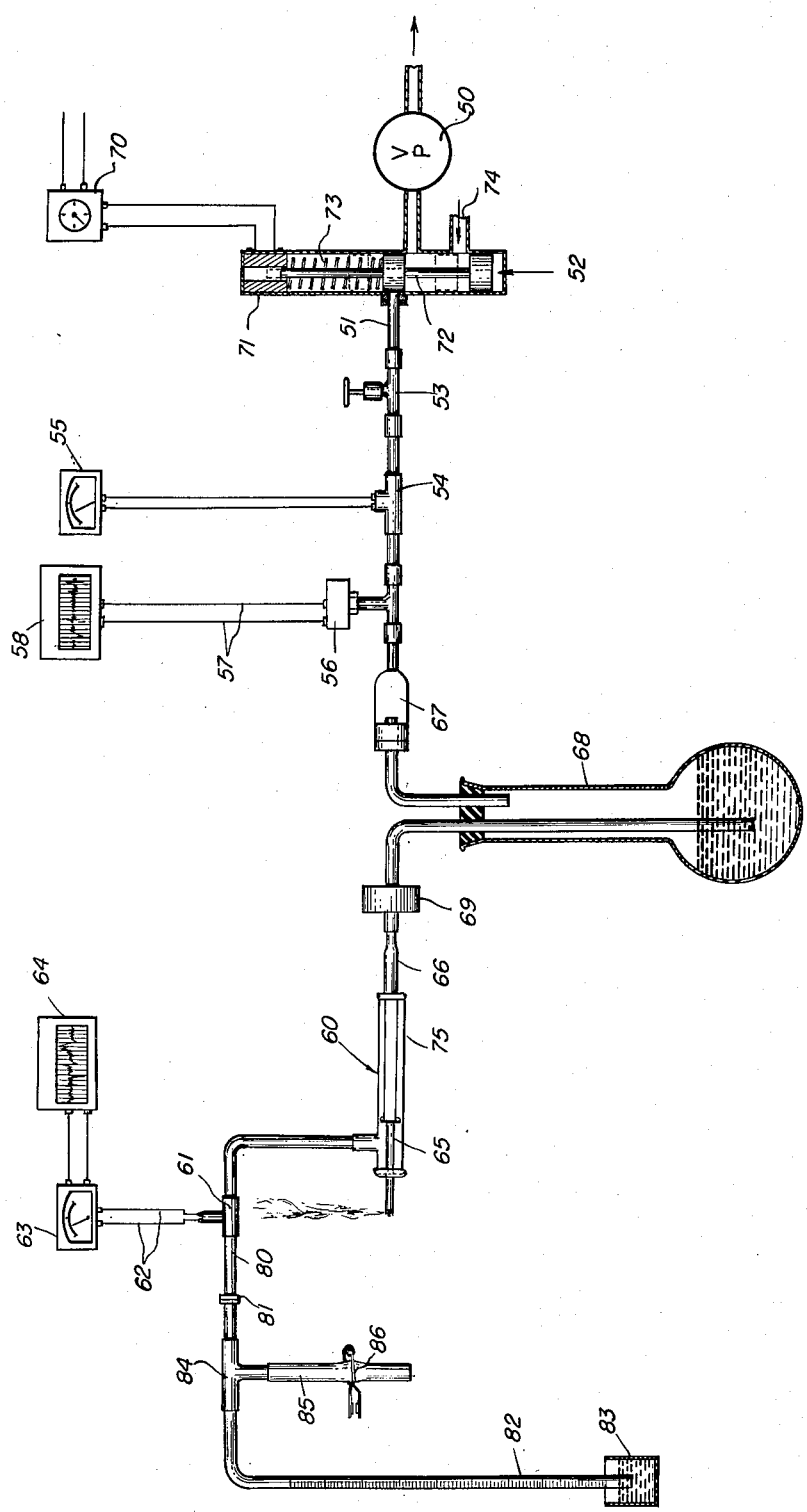
FIG. 3 is a view generally similar to that of FIG. 1 but with the test means embodied in a dynamic puffing or smoking machine adapted to simulate in general the normal conditions of a person smoking the cigarette.

The apparatus of FIG. 1 includes in general a suitable means for producing a flow of air in the main conduit 10 which may comprise a vacuum pump 11. In the conduit 10 there is located a needle valve 12 adapted to regulate the flow of air to a predetermined desired value; a means for measuring the rate of flow of the air in the main conduit 10 which includes a flow tube 13; and a means for measuring the pressure which includes a T-member 14 with a connection to a sensitive pressure measuring device. The latter in the system of FIG. 1 comprises an inclined tube water manometer 15, the upper end of which is connected by a flexible tube 16 with the T-member 14 and the lower opposite end is connected with a liquid reservoir 17. At the end of the main conduit 10 opposite to the vacuum pump 11 is located an adjustable holder 18, for a cigarette or other specimen object, having an outer longitudinally adjustable sleeve 19 in communication through flexible tube 20 with the atmosphere. The tube 20 has therein a means for measuring the flow of fluid therethrough and in turn through the sleeve 19. The meter means includes a flow tube member 21. The device 11 has been described as a vacuum pump creating a flow in the direction to the right through the main conduit 10, but with appropriate adjustments in the conditions flow may be of a positive character in the opposite direction, and of course the circulated fluid may be other than air dependent upon the circumstances.

For the testing of cigarettes or other smoking articles the rate of flow of air is very moderate and the pressures involved are very low, and accordingly the measuring instruments are of a very sensitive character all, however, being readily available commercially. To simulate generally the conditions under which a cigarette is normally smoked by a person, the flow of air through the main conduit 10 is selected as an example at the generally accepted standard of 1050 ccs. per minute, this being established through adjustment of the needle valve 12. The flow meter which includes the flow tube 13 is of a type adapted to measure moderate flow rates such as that just noted. Meters of such type are commercially available and may comprise for example a type of instrument such as that shown in the patent to Hastings No. 2,745,283 which includes a thermopile embodied in the flow tube 13 connected to a suitable indicating means such as that shown at 30 which may also be of the recording type if desired. The by-pass flow meter connected to the adjustable sleeve 19 including the flow tube 21 may be of a type similar to that just described in connection with the member 13 and including an instrument 31 similar to that shown at 30 but which may be adjusted to a different range since the rate of flow through the flow tube 21 will normally be at a lower rate than that through the flow tube 13.

The pressure indicator connected at the T-member 14 may vary as to character but the arrangement shown including the incline tube water manometer 15 is of a sensitive character and well adapted for the purpose. Normally the range of pressure variation for testing cigarettes is within 8 inches of water and in the present case the rise in the tube 15 is adjusted for that range. In other words when the pressure at the connection 14 in the conduit 10 is atmospheric the height of the water level in reservoir 17 may be adjusted so that the head of the water column in the inclined tube 15 is at the zero marking and as the pressure in the main conduit falls below atmospheric the water column advances up the inclined tube 15 to the right. With the arrangement shown the variation in pressure can be read to .01 inch of water.

An important feature of the apparatus and system comprises the adjustable cigarette holder indicated more fully in FIG. 2. The left end of the conduit 10 includes a glass tube portion 35 in which a cigarette 36 may be inserted as shown, the outer end of the glass tube 35 having a flexible rubber seal 37 to prevent leakage into the tube 35 between the cigarette and the outer end of the tube 35. Slidable longitudinally of the tube 35 is the auxiliary tube 19 having a rubber seal of suitable type 40 at its inner end with respect to the tube 35 and an outer flexible rubber seal 41 adapted to engage and form a hermetic seal with respect to the cigarette 36. As a result of the construction described any air entering the tube 35 from the area within the slidable tube 19 must occur through the section of the cigarette located between the seals 40 and 41 and furthermore such inflow of air must all pass through the flow meter tube 21.

In the operation of the device with a cigarette in position the flow through the conduit 10 is set at a desired fixed rate which may be assumed to be, for example, 1050 ccs. per minute which may be determined from the indicator 30. The slide tube 19 is then set at the desired position. For example it may be shifted to the right from the position shown so that the seal 41 occupies a position substantially that indicated by the broken line 41' in which case the air entering through the flow tube 21 and indicated at 31 will comprise the leakage or by-pass through the wall of the cigarette at the joint between the tipping portion 45 and the main body portion of the cigarette 36. In some cases the cigarette may be provided with vent openings in the main body portion immediately adjacent the tip portion 45 and it is desired to measure the by-pass of air into the cigarette through that region. Assuming the slide member 19 has been adjusted to the right to the position 41' as described readings are then taken on the respective indicators 30, 31 and the pressure manometer 15. The reading on indicator 30 is, of course, the total flow of air through the cigarette which in the present example has been set at 1050 ccs. per minute. The flow indicated at 31 divided by the total flow gives of course the percentage by-pass through the area of the cigarette exposed within the slide tube 19. The reading on the manometer 15 indicates the pressure in the conduit 10 below atmospheric which is commonly referred to as the resistance to draw. A common reading would be within the range of 2 to 5 inches of water. This is a factor which it is commonly important to determine particularly where it is desired to measure the effect of different filters or of different sizes, locations, or numbers of vent openings. It is also of interest in connection with different types of tobaccos and different cigarette rod forming conditions including variations in the density or weight of the tobacco.

Further readings may be taken as desired with the slide tube 19 adjusted to different positions. For example it may be moved outwardly so that the seal 41 occupies some intermediate position such as that shown in full line, or to a position indicated generally by the broken line 41", in which substantially the entire length of the cigarette is exposed within the tube 19 and the by-pass through the walls for the entire length is measured on the indicator 31. Such adjustments and reading may be desired in connection, for example, with the determination of the amount of by-pass through the walls of a cigarette provided with a porous type of paper. By taking readings of the flow through the by-pass tube flow meter 21 first with the seal adjusted to the position 41' and then with it adjusted to the position 41", the first reading may be subtracted from the second and the amount of by-pass due solely to the porosity of the paper may be readily determined.

The device is well adapted for various uses other than the ones specifically discussed above. For example the device may be employed for the testing of the resistance to draw produced by varous types of filters and various lengths of filters. In other words instead of a cigarette there may be inserted in the holder a selected length of wrapped filter rod.

FIG. 3 shows a more extended application of the principles of the present invention. In this case it is embodied in a cigarette puffing machine. The system as a whole includes a vacuum pump 50 connected to create a flow of air in the conduit 51 controlled by a timer operated valve indicated more or less diagrammatically at 52 and an adjustable needle valve 53. A flow meter tube is indicated at 54 which may be generally similar to that indicated at 13 in FIG. 1, the flow rate being shown on indicator 55. In this case a pressure indicator is embodied of a type different from that shown in FIG. 1. The pressure operates a variable resistance transducer 56 having electrical connections 57 to an indicator 58.

A cigarette holder is indicated at 60 similar in general to that shown at 18 in FIG. 2. The by-pass air is measured by way of the flow meter tube 61 connected through suitable wires 62 to indicator 63 which may include a recording instrument indicated generally at 64. As previously noted the system is adapted for the dynamic smoking of cigarettes and the cigarette 65 inserted in the holder tube 66 is lighted during the operation.

To prevent injury to the various instruments and erroneous readings, suitable devices are preferably inserted between the lighted cigarette and the recording instruments to the right of the cigarette holder. These may include, for example, a filter such as a charcoal filter indicated generally at 67, a liquid purifying flask 68 and a standard cigarette filter 69 embodying suitable desired chemicals.

To more fully simulate normal smoking conditions the system includes a timer operated valve means 52 for producing intermittent suction on the cigarette for predetermined periods. Associated with the valve mechanism 52, which may vary as to construction or type, but is here indicated to be a reciprocatory piston type, is a timer mechanism 70 having electrical connections to a solenoid 71 which upon energization moves the valve member 72 upwardly to the position shown in broken lines, the valve being normally urged in the opposite direction by a spring means such as that indicated at 73. In the position shown the vacuum pump 50 is connected to the atmosphere through the pipe 74 but upon energization of the solenoid 71, which moves the valve to the upper broken line position, the connection to the atmosphere is closed off and the pump is connected into the main conduit line 51 leading to the cigarette holder 60. The time period and the cycle may be varied as desired but as a general standard practice the timer 70 is adapted to produce a suction on the cigarette holder for a period of 2 seconds each minute. As the smoking continues the slide member 75 of the cigarette holder is manually shifted an appropriate distance to the right after each puff which under average conditions is about 5 millimeters.

Although the amount of by-pass both in absolute terms and in terms of percentage with respect to the entire flow may be determined through the means of the recorders 55 and 63, it is desirable in some cases to obtain a further or more direct reading of the volume of the by-pass on each puff and accordingly FIG. 3 shows a volume measuring device which is separably connected to the by-pass line 80 by means of a coupling 81. The volume measuring meter comprises a graduated tube 82 the lower end of which is submerged in a liquid in the container 83, the liquid being preferably a soap solution. Intermediate of the volume meter 82 and the coupling 81 is a T-member 84 from which depends a rubber tube 85 open at its lower end but provided with a pinch clamp 86 or some suitable quick opening valve. At the end of each puff the volume reading on graduated tube 82 may be noted and thereupon the pinch clamp 86 is released to permit air to enter and adjust the liquid column 82 to a zero reading. Since the apparatus including the timer 70 are operated on a one minute cycle, there is adequate time for taking a reading and restoring the zero condition in the volume meter 82. The apparatus shown enables the conditions to be determined, and particularly the amount of by-pass and the resistance to draw, at different stages in the consumption of the cigarette and under substantially normal smoking conditions.

It should be understood that various changes may be made in the above described systems and apparatus and further different embodiments of the invention could be made without departing from the scope thereof, and it is intended that all matter contained in the above description or shown in the accompanying drawing shall be interpreted as illustrative and not in a limiting sense.

We claim:

1. Apparatus for testing the fluid flow characteristics of a pervious object of substantial length, comprising a main fluid conduit, a holder having a connection to said main conduit and an opening to receive one end of a specimen object including a hermetic seal about the object, an outer sleeve arranged to provide a fluid chamber around said end opening and a portion of the object, said sleeve having a hermetic seal with the object and a fluid connection to the atmosphere, the object portion exteriorly of said sleeve being exposed to the atmosphere, means connected with said conduit for producing a flow of air therethrough, a portion of the air passing through said main conduit being directed through the object and said chamber and its connection to the atmosphere and the remaining portion passing through said exterior portion of the object, said sleeve being adjustable longitudinally of the object to vary selectively the relative portions of the object within said sleeve and exteriorly thereof, and means for determining independently the rate of air flow through said main conduit and through said chamber.

2. In an apparatus for testing the fluid flow characteristics of an elongated pervious object, a main fluid conduit, a tubular holder having an opening at one end adapted to receive an end of a specimen object, a sleeve slidable on said holder having a hermetic seal at its inner end around said holder, and an outer hermetic seal adapted to engage around the object, said sleeve having a fluid passage opening through the wall thereof, and said sleeve being longitudinally adjustable to selective positions along said holder and the object, and means for producing a flow of fluid through said conduit and thereby said holder.

3. In an apparatus for testing the fluid flow characteristics of an elongated smoking article, a tubular holder having an opening at an outer end adapted to receive an end of the article and having a hermetic seal therewith, a sleeve mounted on said holder having a hermetic seal around said holder and also having an outer hermetic seal around the article providing a chamber around said outer end between the seals, said sleeve having a fluid opening connecting with said chamber, and means for producing a flow of fluid through said holder, part of the fluid passing through the article and said fluid opening in the chamber, and part passing through the article beyond said outer seal depending upon the pervious characteristics of the article, said sleeve being adjustable to selected positions longitudinally of said article to vary the relative portions of the article within said chamber and exteriorly thereof beyond said outer seal.

4. In an apparatus for testing the fluid flow characteristics of a cigarette, a main fluid conduit, a tubular holder connected to said conduit having an opening at an outer end adapted to receive an end of the cigarette and having a hermetic seal therewith, a sleeve mounted on said holder having a hermetic seal around said holder and also having an outer hermetic seal around the cigarette providing a chamber around said outer end between the seals, said sleeve having an opening connecting said chamber with the atmosphere, suction means connected to said conduit for producing a flow of air therethrough, part of the air passing through the cigarette and said fluid opening in the chamber, and part passing through the cigarette beyond said outer seal depending upon the pervious characteristics of the article, said sleeve being adjustable to selected positions longitudinally of said cigarette to vary the relative portions of the cigarette within said chamber and exteriorly thereof beyond said outer seal, means for measuring the fluid flow through said opening into said chamber, means for measuring the fluid flow through said main conduit, and means for measuring the pressure in said main conduit.

5. In an apparatus for testing the fluid flow characteristics of an elongated smoking article, a main fluid conduit, a tubular holder having an opening at one end adapted to receive an end of a specimen article, a sleeve slidable on said holder having a hermetic seal at its inner end around said holder, and an outer hermetic seal adapted to engage around the article, said sleeve having an opening to the atmosphere through the wall thereof, and said sleeve being longitudinally adjustable to selective positions along said holder and the article, and means for producing intermittently and for predetermined time periods a flow of air through said conduit and thereby said holder.

6. Apparatus for testing the fluid flow characteristics of a smoking article of substantial length, comprising a main fluid conduit, a holder having a connection to said main conduit and an opening to receive one end of a specimen article including a hermetic seal about the article, an outer sleeve arranged to provide a fluid chamber around said end opening and a portion of the specimen, said sleeve having a hermetic seal with the article and a fluid connection to the atmosphere, the article portion exteriorly of said sleeve being exposed to the atmosphere, means for producing intermittently and for predetermined time periods a flow of air through said conduit, a portion of the fluid passing through said conduit being directed through the article and said chamber and its connection to the atmosphere and the remaining portion passing through said article exteriorly of said sleeve, and means for measuring the volume of air drawn through said connection to the atmosphere during each said period.

References Cited in the file of this patent

UNITED STATES PATENTS

| 2,228,216 | Morgan | Jan. 7, 1941 |
| 2,521,079 | Morris | Sept. 5, 1950 |

FOREIGN PATENTS

| 1,025,173 | Germany | Feb. 27, 1958 |